Jan. 17, 1939.　　　　　D. A. COLLINGS　　　　　2,144,011
FOUR-WHEEL BRAKE SYSTEM
Filed Oct. 15, 1937　　　　3 Sheets-Sheet 1
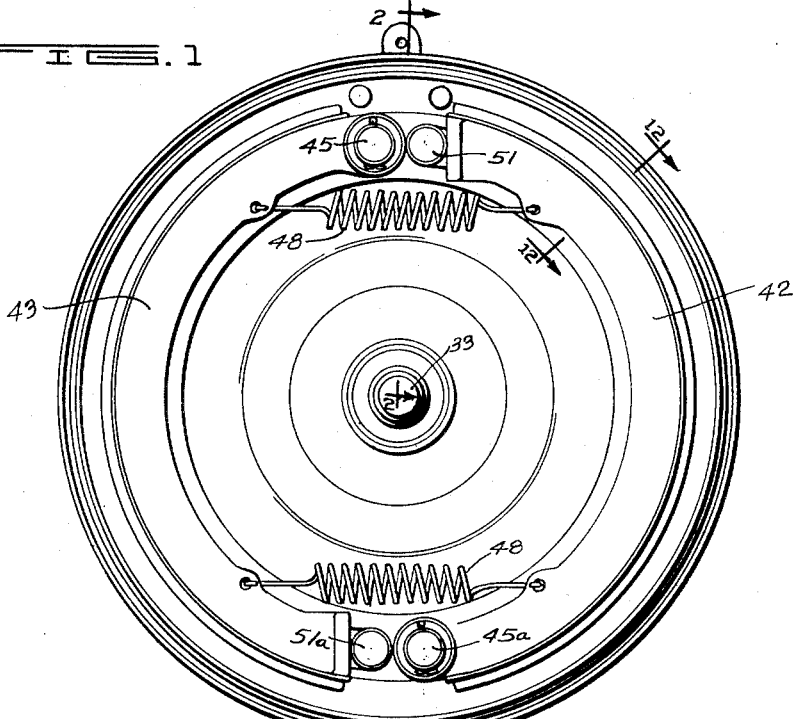
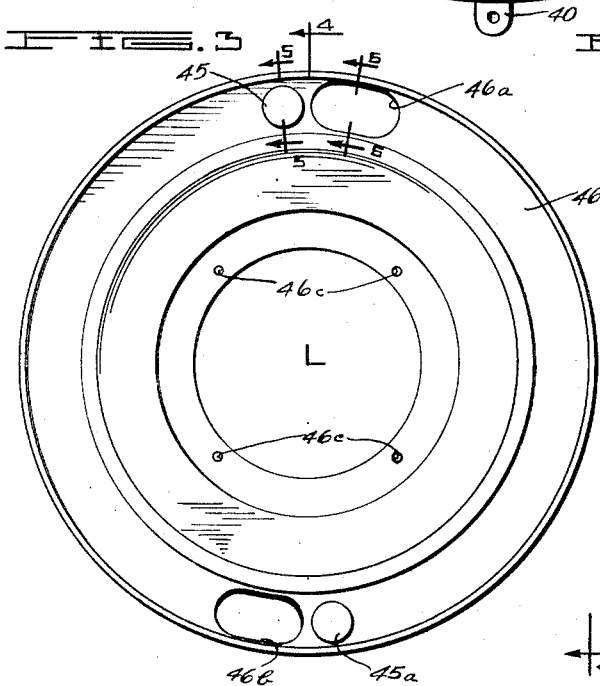
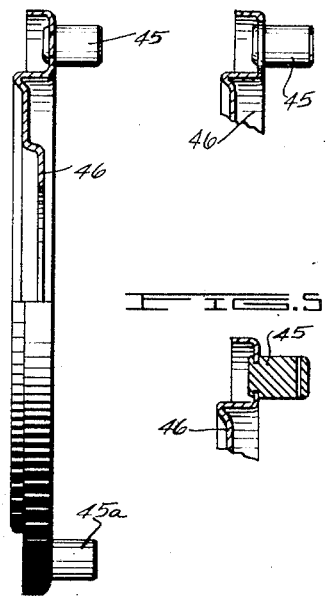
INVENTOR.
David A. Collings
BY John A. Bommhardt
ATTORNEY.

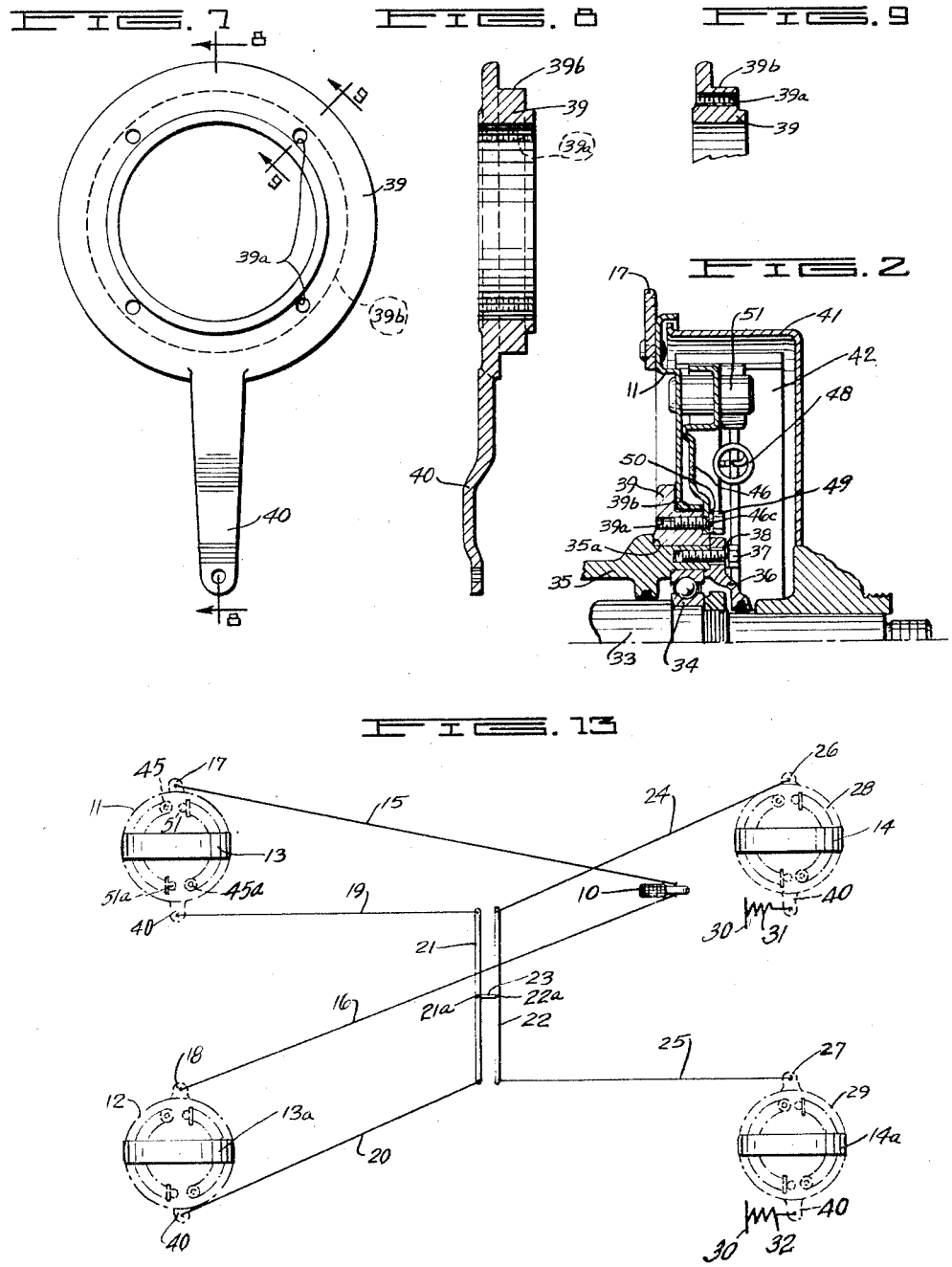

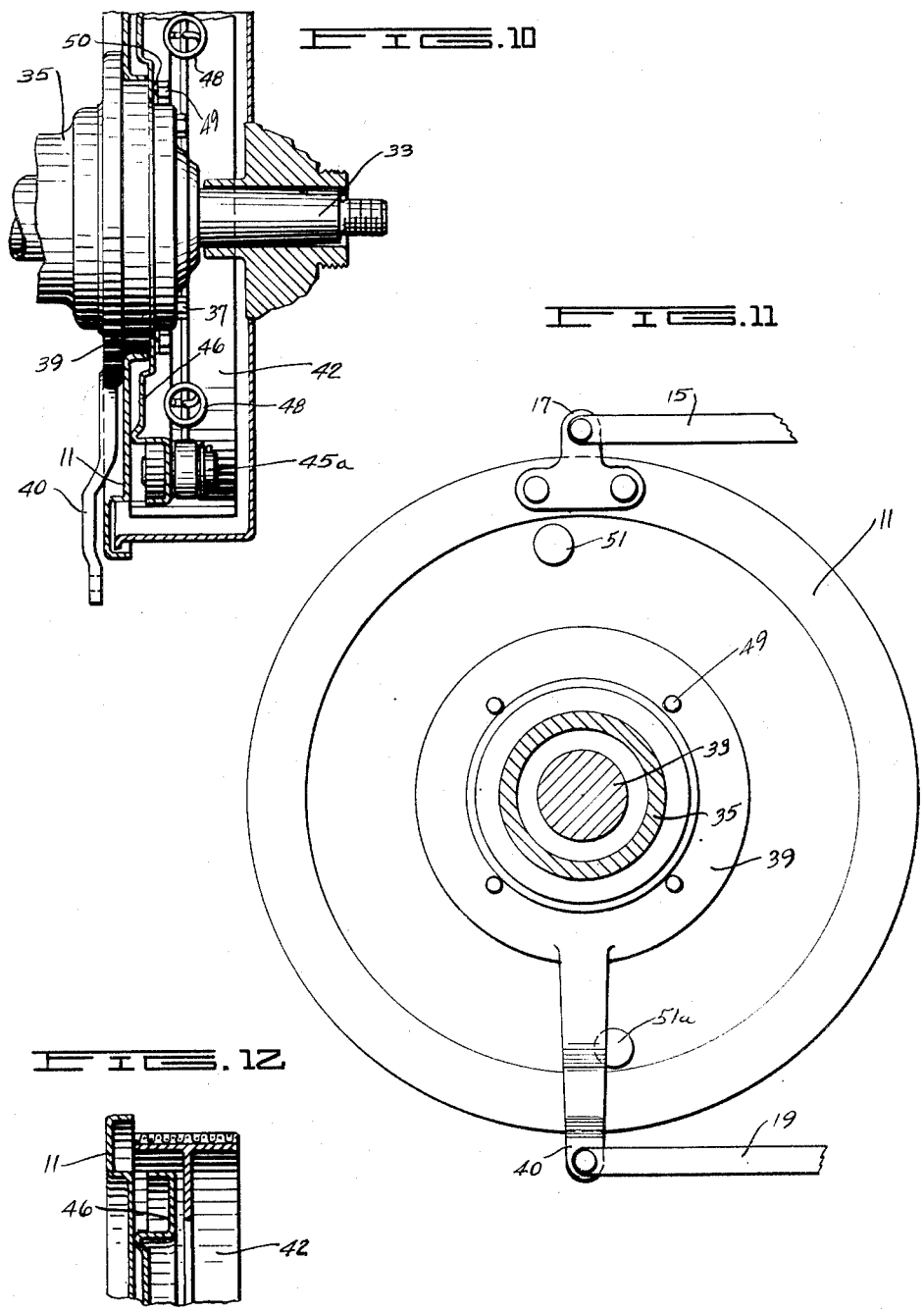

Patented Jan. 17, 1939

2,144,011

UNITED STATES PATENT OFFICE 2,144,011

FOUR-WHEEL BRAKE SYSTEM

David A. Collings, Cleveland, Ohio

Application October 15, 1937, Serial No. 169,105

10 Claims. (Cl. 188—2)

My invention relates to braking systems for any vehicle supported by wheels and requiring some device to retard movement and to make a complete stop.

The primary object of this system is to provide a means whereby the torque produced by each wheel is equalized when the brakes are applied, the co-efficient of friction remaining the same on all wheels.

Another object is to provide a braking system upon which wear of any or all parts has no effect upon the ability to instantly and automatically produce the same drag on all four wheels throughout the entire life of the brake linings.

Further objects and advantages are the elimination of frequent brake adjustments, trueing of brake drums and tire wear; positive braking equalization of all wheels, which materially increase the life of brake linings, permit greater speeds with safety and reduce accidents from skidding and blowouts due to unequal brakes.

It will be seen from the following specification that the manual application of the braking system is indicated but the device may be successfully used with any other type of operation; the effect on all wheels being equal and in direct ratio to the applied force by any adequate means of operation.

The following specification and its accompanying drawings, illustrate the device and its application in which, Fig. 1 is a view in elevation of one of the brakes.

Fig. 2 is a sectional view through the top portion of the assembled brake.

Fig. 3 is a view in elevation of the brake shoe anchor disc.

Fig. 4 is a side elevation partly in section taken on lines 4—4 of Fig. 3.

Fig. 5 is a fragmentary section taken on lines 5—5 of Fig. 3.

Fig. 6 is a fragmentary section taken on lines 6—6 of Fig. 3.

Fig. 7 is a view in elevation of one of the equalizing devices.

Fig. 8 is a section taken on line 8—8 of Fig. 7.

Fig. 9 is a fragmentary section on line 9—9 of Fig. 7.

Fig. 10 is an elevation partly in section of the equalizing device and the brake elements with top section broken away.

Fig. 11 is a full inside elevation of Fig. 7 with the axle and housing in section.

Fig. 12 is a fragmentary section taken on lines 12—12 of Fig. 1.

Fig. 13 is a diagrammatic layout showing the manual operation of the torque equalizing brake system as applied to a modern automobile with four wheel brakes.

In this application the foot pedal 10 is connected to the brake actuating discs 11 and 12 of the rear wheels 13 and 13a only, by suitable means such as cables or rods 15 and 16 through lugs 17 and 18 secured to the top of the rear wheel brake actuating discs 11 and 12 respectively, by bolts or other suitable means.

Other cables or rods 19 and 20 (or the like) are attached to the bottom of the rear wheel brake equalizing members, as hereinafter described, at one end, the opposite ends of said cables or rods being secured to a rear equalizing bar 21.

A front equalizing bar 22 is pivotally connected at 22a at its middle point to one end of a connecting link 23, the rear equalizing bar 21 being pivotally connected at 21a at its middle point to the opposite end of the connecting link 23.

Cables or rods 24 and 25 (or the like) secured to the outer ends of the front equalizing bar 22 are secured at their opposite ends to lugs 26 and 27 attached to the top of the front brake actuating discs 28 and 29, the equalizing members of the front wheels being secured to the front axle 30 by means of springs 31 and 32 (or any like means) as illustrated in Fig. 13.

Secured over the axle 33 on a bearing 34 is an axle housing 35, to which is secured an axle housing cap 36 by means of a plurality of bolts 37 with lock washers 38.

Superimposed over the housing 35, between the shoulder 35a and the cap 36, is an equalizing ring member 39 having a plurality of bores 39a therethrough and with a bearing fit around said housing which permits a free turning movement. Lever-arms 40 project downwardly from the equalizing members 39 and are secured to the rods or cables 19 and 20, 24, and 25 thus linking the brake equalizing members 39 to the front and rear equalizing bars 21 and 22 through the link 23 as illustrated in Fig. 13.

A drum 41 attached rigidly to the wheel of a vehicle and rotating therewith has mounted therein brake shoes 42 and 43 which expand against the inner periphery of the drum 41 resulting in friction between the said drum and the shoes 42 and 43.

The shoes 42 and 43 on opposed sides within the drum 41 have bearing apertures respectively at one end of each shoe through which pivot pins 45 and 45a are mounted, securing the said shoes 42 and 43 pivotally to a brake shoe anchor disc 46, to which the pivot pins 45 and 45a are securely attached, and said shoe anchor disc 46 has a pair of elongated slots 46a and 46b therethrough near the top and bottom of its outer periphery, and a plurality of apertures 46c in the brake shoe anchor disc 46 register with the bores 39a in the equalizing member 39, bolts 49 and lock washers 50 securing the shoe anchor disc 46 rigidly to the equalizing member 39.

Tension springs 48 are mounted at the top and bottom between the shoes 42 and 43 and are secured at their opposed ends to the opposed shoe within the drum 41.

The brake actuating discs 11, 12, 28 and 29 are mounted with a bearing fit on the hub 39b of the equalizing member 39, being free to turn thereon. Said brake actuating discs have mounted securely thereon a pair of pins 51 and 51a over which the brake shoe anchor disc 46 is mounted, said pins, when the discs are activated, move within the elongated slots 46a and 46b in the brake shoe anchor disc and cause the brake shoes 42 and 43 to expand against the inside periphery of the brake drum 41.

In operation, when the foot pedal 10 is depressed the brake actuating discs 11, 12, are directly rotated, bringing the brake shoes 42 and 43 into frictional engagement with the inner periphery of the brake drum 41. The friction thus created between the drum 41 and the shoes 42 and 43 produces a rotary torque in the equalizing members 39 of the brakes on the rear wheels 13 and 13a, this torque being transmitted from one brake to the other and controlled and balanced between the brakes of said rear wheels by the rear equalizing bar 21; the front equalizing bar 22, through the link 23 with the rear equalizing bar 21, transmits the movement of the equalized pull therethrough to the operating discs 28 and 29 of the front wheels.

The brake equalizing rings 39 on the front wheels 14 and 14a, in this application, are shown anchored through springs 31 and 32 to the front axle 30, said springs taking up the shock when the brakes are applied and giving smoother operation.

It will be seen by the foregoing description and its accompanying illustrations that no matter by what means the brakes are applied, the braking effect on all wheels is equal and in direct ratio to the applied force.

It will also be seen that the structure provides a brake mechanism of the internal expanding shoe type, containing two shoes which will expand with equal pressure against the drum when the brake is operated. This will be understood from the facts that the fixed pivots 45 and 45a of the shoes 43 and 42 are diametrically opposite, and the operating pins 51 and 51a of the respective shoes are located diametrically opposite, so that when pressure is applied by turning the disc which carries said pins both shoes are operating similarly, and the friction on both shoes is in a direction to cause the shoe to draw into closer engagement with the drum. This is different from the action of the ordinary expanding shoe brake in which both shoes are pivoted at one side of the axis and the free ends of the shoes are spread by a cam or otherwise in opposite directions, wherefore the frictional engagement of one of the shoes tends to push it away from the drum. In the present invention both shoes swing or travel in the same circular direction, therefore doubling the self energizing effect.

I claim:

1. In a four wheel brake system, the combination with the front and rear wheel brakes, of a brake lever connected to the rear wheel brakes, a rear equalizing lever connected to a movable friction applying part of each of the rear wheel brakes, a front equalizing lever connected to the rear equalizing lever, and brake operating connections between the front equalizing lever and the front wheel brakes respectively.

2. The combination stated in claim 1, the connection between the rear equalizing lever and the said movable part of the rear wheel brakes being at opposite ends of the lever respectively, the connection between the front and rear equalizing levers being at the middle of the levers, and the connection between the front equalizing lever and the front wheel brakes being at the ends of said lever.

3. The combination with a pair of wheel hubs, a pair of expanding shoe brakes thereon, and means to apply the brakes, of an equalizing ring rotatably mounted on each wheel hub and operatively connected to the means for expanding the shoes and applying the respective brakes, and an equalizing lever connected at opposite ends to the respective equalizing rings, whereby, when the brakes are applied turning torque of the rings will be transmitted to each other through the lever.

4. The combination of a pair of wheel hubs, an expanding shoe brake mechanism associated with each hub, each mechanism including a turning disc, operating devices between the disc and the brake shoes, a turning anchor disc to which the brake shoes are pivoted, an equalizing ring fixed to the anchor disc and having a projecting arm, and an equalizing lever connected to the arms of the respective rings.

5. The combination stated in claim 4, together with another pair of brakes, an equalizing operating lever connected to each, and a connection between the respective equalizing levers to transmit the movement of one to the other.

6. The combination with a pair of wheel hubs, of a brake mounted on each hub, and means to apply the brakes, each brake comprising expanding shoes, a rotary operating disc connected to the shoes, a rotary equalizing ring mounted between the disc and the hub, an anchor disc fixed to the ring and enclosed by the operating disc, and to which the shoes are pivoted, and equalizing connections including a lever, between the rings of the respective brakes.

7. In a four wheel brake system having two rear wheel brakes and two front wheel brakes, the combination of means to directly apply the rear wheel brakes, equalizing devices between the two rear wheel brakes and the two front wheel brakes, said devices including a lever, and means to transmit the movement of the lever to apply the front wheel brakes.

8. The combination stated in claim 7, said means including an equalizing lever connected to the two front wheel brakes, and a pivotal connection between the two equalizing levers.

9. In a brake the combination with a drum, of a pair of internal expanding shoes cooperating with said drum, a supporting member to which the said shoes are pivoted at one end, the pivots of the respective shoes being located at diametrically opposite positions with respect to the axis of the drum, a disc mounted to turn around the axis of the drum, and pins projecting from the disc and bearing against the free ends of the shoes at diametrically opposite sides of the axis of the drum.

10. The combination of a brake drum, a pair of internal expanding shoes cooperating with said drum and pivoted respectively adjacent opposite sides of the drum, a turning member arranged to turn around the axis of the drum, and a pair of projections carried at diametrically opposite sides of said member and bearing against the free ends of the shoes respectively, whereby both shoes swing in the same circular direction when the brake is operated, the said member comprising a turning disc, and the projections comprising pins projecting from said disc.

DAVID A. COLLINGS.